Feb. 21, 1933.   I. SIKORSKY   1,898,694
SHOCK ABSORBER
Filed Oct. 24, 1928   2 Sheets-Sheet 1
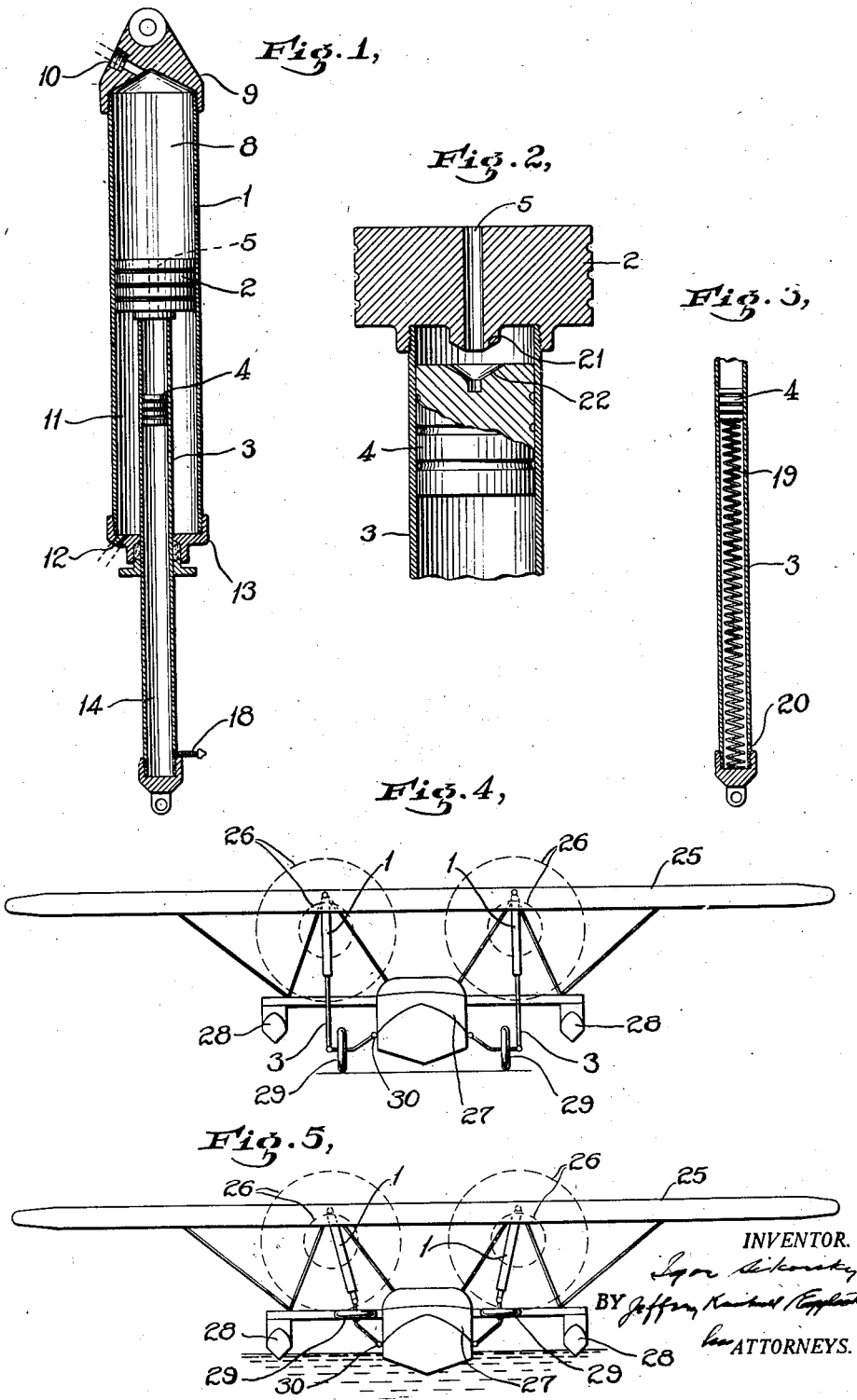
INVENTOR.
Igor Sikorsky
BY
ATTORNEYS.

Feb. 21, 1933.   I. SIKORSKY   1,898,694
SHOCK ABSORBER
Filed Oct. 24, 1928   2 Sheets-Sheet 2
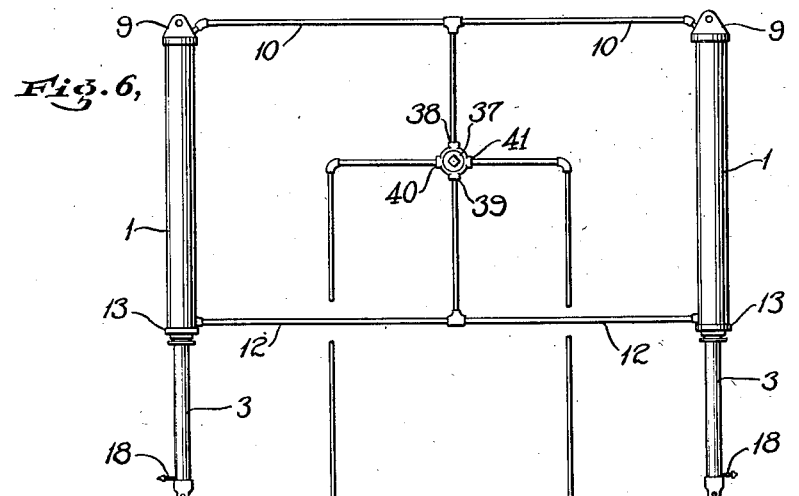

Patented Feb. 21, 1933

1,898,694

UNITED STATES PATENT OFFICE

IGOR SIKORSKY, OF COLLEGE POINT, NEW YORK, ASSIGNOR TO SIKORSKY AVIATION CORPORATION, A CORPORATION OF DELAWARE

SHOCK ABSORBER

Application filed October 24, 1928. Serial No. 314,585.

The objects of my invention are to provide a shock absorber particularly adapted for air craft, but usable elsewhere as will be apparent, and also to provide a device for aircraft combining the functions of a pneumatic or hydraulic type of shock absorber and the functions of a retractor for the landing wheels. In the latter form it may serve either to raise the wheels to reduce air resistance in flight or, in amphibian aircraft, to raise the wheels sufficiently to permit the craft to alight on pontoons or floats in a satisfactory manner. The invention can be applied to landing devices other than wheels, for example skids, as well as to wheels as will be plain, and herein I include such other landing devices within the term "wheels".

Insofar as it concerns a shock absorber alone, my invention contemplates an arrangement of cylinder and piston in which the piston drives fluid from the cylinder through a more or less restricted passage or orifice, of constant or variable cross-sectioned area, when the piston (or cylinder) is moved by the wheels striking the ground in landing, or when taxiing over rough terrain, the shock absorber of my invention being characterized however by the fact that the fluid is expelled from the front of the piston into another chamber, that is to say, a chamber other than that provided by the cylinder immediately at the back or retreating side of the piston and in part formed by the back or retreating side of the piston. The chamber may be incorporated into the cylinder-piston unit however, or it may be located more or less remote from the cylinder-piston unit and connected to the latter by pipe or passage. The fluid is driven into said another chamber against an elastic force which serves to restore the piston (or cylinder) to its initial position when the pressure on the wheels is removed. The fluid may be, and usually will be a liquid, for example oil, and the elastic restoring force may be provided by a partition such as a piston in the chamber backed by a spring, or a gas compressed by the fluid entering through the orifice. Preferably the piston rod of the shock absorber is made hollow, and the interior of the piston rod serves as the chamber that receives the fluid forced through the orifice.

As it concerns a combined pneumatic or hydraulic shock absorber and retractor for the wheels, my invention involves a shock absorber of the type indicated, that is to say a cylinder and piston arrangement for driving a fluid through a restricted passage or orifice, combined usually with a source of fluid under pressure to apply pressure to the shock absorber per se at will to retract the wheels, usually by driving the piston (or cylinder) in the same direction as the piston (or cylinder) is driven by the wheels when alighting on land.

The shock absorber per se of my invention briefly described above is peculiarly well adapted to be combined with a source of fluid pressure to provide for wheel retraction. A shock absorber so constructed has the back or retreating face of its piston free. Fluid from an outside source therefore, it may be either a gas or a liquid, can be directed against this face and the shock absorber structure thus collapsed in a manner that raises the wheels. The fluid used in the cylinder for shock absorbing purposes may be withdrawn or permitted to flow out freely when the wheels are to be raised, so as not to impede movement of the piston in the cylinder under the thrust of the fluid from the outside source. As an alternative to raising the wheels by fluid pressure, springs or elastic bands may be arranged to collapse the shock absorber and thus raise the wheels when the shock-absorbing fluid in the cylinder is released; in such an arrangement the wheels are lowered again by forcing shock-absorbing fluid back into the cylinder again.

The accompanying drawings illustrate various forms of my invention applied to amphibian airplanes: Fig. 1 is a section of a preferred form of the shock absorber of my invention shown in an extended condition; Fig. 2 is a sectional detail thereof; Fig. 3 is a sectional view illustrating a slight modification of Fig. 1. Fig. 4 diagrammatically illustrates the shock absorbers of Figures 1 and 3 applied to an amphibian plane, the wheels being in position for alighting on land. Fig. 5 is a similar figure, but showing the wheels retracted for alighting on water. Fig. 6 is a diagrammatic showing of the combination of shock absorbers like Fig. 1 with a source of fluid pressure for wheel retraction, for example as applied to Figs. 4 and 5. Figs. 7 and 8 are diagrammatic representations of the control valve of Fig. 6 in two different positions. Figs. 9 and 10 illustrate modifications.

In the shock absorber of Fig. 1, the cylinder is marked 1 and the main piston within this cylinder is marked 2. The piston rod 3 of this piston is hollow and contains a piston 4. At 5 a restricted passage or orifice is pierced through the main piston 2. Fluid, usually a liquid and usually oil, fills the chamber 8 between the main piston 2 and the cylinder head 9. For the present, it can be assumed that the opening 10 through cylinder head 9 is for the purpose of filling the chamber 8 and that is closed when the device is in operation; for the present also it can be assumed that the chamber 11 is open to the atmosphere through the passage 12 in the cylinder head 13. The piston 2 prevents the passage of fluid from chamber 8 to chamber 11 and vice versa. In the chamber 14 of the hollow piston rod 3 is contained the elastic force for returning the piston 4 toward the piston 2. This may be a gas, usually air, under such pressure as may be necessary (as will be understood from the following description), and if desired under such further initial pressure as may give the desired work characteristic to this elastic force; a connection and valve 18 serve to admit the gas and seal the chamber 14 in operation. In the alternative, the elastic force may be provided by a spring 19 as illustrated in Fig. 3, an opening 20 of adequate size providing for the free passage of air to and from the atmosphere as the piston 4 moves within the piston rod 3. In flight at least, the piston 4 will usually rest against the piston 2. In order to aid in sealing the chamber 14 from the chamber 8 and restrain the passage of gas from 14 into 8, the piston 2 and piston 4 may be provided with oppositely facing co-operating valve seats around the orifice 5, as illustrated in Fig. 2. As another alternative, the chamber corresponding to chamber 14 in function, can be located more or less remote from the cylinder 1 and piped to the cylinder as illustrated in Fig. 10, the piston 4 therein being backed by an elastic force, for example gas or a spring as shown. In such and analogous arrangements, the orifice may be provided in a diaphragm 21 within the cylinder or the pipe or passage itself connecting the cylinder and the chamber may be used as the orifice.

It will be understood that more or less energy is absorbed as the piston 2 works back and forth within the cylinder 1 and thereby causes the fluid to pass through the orifice 5.

The manner in which I apply such a shock absorber to an amphibian plane is diagrammatically illustrated in Figs. 4 and 5. The supporting wing of the plane is illustrated at 25 and the engines and propellers by the broken lines at 26. Room for the pilot and passengers or freight is provided in the pontoon or boat 27. Side floats are shown at 28. The pontoon and floats can be tied to the wing 25 in any suitable manner; struts are shown for this purpose. Each of the two landing wheels 29 is hinged at 30 to the pontoon or boat, so that they may be raised for alighting on water. It will be understood however that basically my invention is not concerned with the details of construction of the aircraft and that it can be applied to aircraft of any design. Usually I use one of the shock absorbers of the preceding figures for each landing wheel or group of adjacent landing wheels, attaching the piston and cylinder of each, one to the body of the plane and the other to the wheel or wheels it serves. Thus in the present instance the head 9 of each of the cylinders 1 is connected to the framework of the wing 25 and the pistons 3 are connected to the axles of the wheels 29. When the craft is in flight, the shock absorber will be somewhat more extended than shown in Fig. 1, the pistons 2 being somewhat lower in their cylinders 1 and the pistons 4 say against the undersides of the pistons 2. The wheels 29 however will be held about as shown in Fig. 4, that is to say, in landing position. As the wheels strike the ground in alighting, the pistons 2 are momentarily driven higher up in the cylinders 1, thus forcing fluid through the orifice 5 and into the piston rod, and driving the pistons 4 down and thereby compressing the elastic forces below them. As the downward movement of the body of the plane is stopped, the elastic forces expand again, raising the pistons 4, driving fluid back into the chamber 8, and thereby raising the cylinders 1 again with respect to their pistons 2. In taxiing over land, the devices act in much the same way as will be apparent. The devices serve as shock absorbers therefore. When the aircraft is at rest on the ground on the wheels 29, the pistons and cylinders of the shock absorbers may have more nearly the positions of Fig. 1, that is to say the pistons 2 may stand somewhat higher than in flight and the pistons 4 may be displaced somewhat downwardly from the pistons 2.

In order to retract the wheels, for example to the positions shown in Fig. 5 whereby the plane may alight and rest on its floats or pontoons on the water as illustrated in Fig. 5, I direct into the chamber 11, through the port 12, fluid under pressure from a source carried on the aircraft; that is to say I direct this fluid under pressure against the face of the piston 2 which is opposite that face of the piston against which the fluid in the chamber 8 impinges. At the same time I open the port 10 so as to permit the escape of the fluid from the chamber 8. Like the fluid in the chamber 8, the fluid used in the chamber 11 may be oil. By thus forcing fluid into the chamber 11 and permitting the escape of fluid from the chamber 8, I force the collapse of each of the shock absorbers, that is to say I force the pistons 2 towards the cylinder heads 9, thereby raising the wheels 29 from their landing position to the positions of Fig. 5, in which position the wheels are beyond the reach of the water. To restore the wheels from the positions of Fig. 5 to landing position while in flight, it is usually only necessary to withdraw the fluid from the chambers 11, the weight of the moving parts being sufficient to force the landing wheels and pistons 2 down to landing position. Then upon refilling the chambers 8, the apparatus is again in condition for performing its shock-absorbing functions. However, if and when necessary the wheels can be restored to their landing positions by forcing the fluid into the chambers 8 thereby substantially forcing the pistons 2 downwardly, at the same time permitting the escape of fluid from the chamber 11 if this fluid is incompressible.

The sources of fluid pressure on the aircraft can assume various forms. Fig. 6 illustrates the arrangement which I prefer. This arrangement presumes that the same fluid is used in the chamber 11 as in the chamber 8. At 35 is a storage reservoir for this fluid. A hand pump for the fluid is shown at 36. At 37 is a four-way valve. All the ports 10 of the shock absorbers are piped to the port 38 of this valve 37; likewise all the ports 12 of the shock absorbers are piped to the port 39 of the valve 37. The outlet port of the hand pump 36 is connected to the port 40 of the valve, and the fourth port 41 of the valve affords a return for the fluid to the reservoir 35. The inlet of the hand pump 36 is connected to the reservoir 35. Assuming that all the piping and apparatus shown to the left of the hand pump 36 in Fig. 6 is omitted (as it may be) the apparatus then functions as follows: By turning the valve 37 to the position indicated in Fig. 7, port 40 is connected to port 38, and port 41 is connected to port 39; hence it is evident that by operating the hand pump 36, fluid can be passed from the reservoir 35 to the chambers 8 of the shock absorbers (under pressure if necessary), and at the same time fluid from the chambers 11 is permitted to escape and return to the reservoir 35. The chambers 8 are thus filled with the fluid and the return of the landing wheels to landing position is assured. When this has been done, the fluid may be locked in the chambers 8 by turning the valve 37 one-eighth of a rotation, so as to close all four of the ports of this valve. Now when the wheels are to be retracted the valve 37 is turned to the position of Fig. 8, in which position ports 38 and 41 are connected and ports 39 and 40 are connected. This permits the fluid to escape from the chambers 8 and (passing from 38 to 41) enter the storage reservoir 35. At the same time, the operation of the hand pump 36 forces fluid from the reservoir 35 (by way of ports 40 and 39) into the chambers 11 of the shock absorbers, whereby the pistons 2 are forced up and the wheels retracted. They are held retracted by again turning valve 37 to a lapped position.

If desired, a power pump can be substituted for the hand pump 36, or added as a second pump. The matter to the left of the hand pump 36 in Fig. 6, illustrates a power pump arrangement. At 42 is a wind driven pump operated by the propeller 43. With a wind driven pump, a hand pump 36 is useful for such operations as may be required while the aircraft is at rest; regardless of the type of power pump it may be useful in an emergency in flight should the power pump fail. Being wind driven, the pump will ordinarily be in operation at all times while the craft is in flight. Therefore a by-pass connecting the inlet and outlet ports of the pump 42 is provided to permit circulation of the fluid through the pump without effect on the shock absorbers; the manual shut-off valve 47 in this by-pass is normally open. Also connecting the inlet and outlet ports of the power pump 42 there may be provided a second by-pass normally closed by the automatic valve 48, this valve being normally held closed by a spring which permits this valve to open and provide a direct path from the outlet to the inlet port of the power pump should the pressure of the fluid at the outlet of the power pump become excessive at any time. At 49 a check valve prevents the passage of fluid back toward the reservoir at the point where this valve is inserted. The operation of the device by means of the power driven pump 42 is as follows: When the valve 37 is lapped, that is to say all its ports are held closed, the manual valve 47 is presumed to be open; the pump 42 now simply circulates fluid through the by-pass thus provided. To retract the wheels, the valve 37 is first turned to the position of Fig. 8 as before described and valve 47 is closed. This causes the fluid from the outlet port of the pump 42 to flow to the chambers 11 of the shock absorbers and raise the wheels as before described; it is assumed (as will usually be the case) that the hand pump 36 is of such a type as does not permit reverse flow through it while the pump 42 is in action. When the wheels have been retracted, the valve 47 is opened again and the valve 37 lapped. When fluid is to be restored again to the chambers 8, the valve 47 is closed and the valve 37 turned to the position in Fig. 7, and when the chambers have been filled the valve 37 is again lapped and 47 is opened. It will be observed that valve 48 as a safety device, stands ready at all times to prevent bursting of pipes should the valves 37 and 47 be improperly manipulated or manipulated late. Should the pump 42 fail, or while this pump is out of operation (when this craft is resting on land or water) and hand pump 36 may be used as before described, the non-return valve 49 preventing useless circulation through 47 or 42 or both.

Alternative to retracting the wheels by fluid pressure, an elastic force, such as a series of elastic bands, may be applied to each of the shock absorbers in a manner continuously urging the shock absorbers to collapsed or wheel-retracted position; the wheels are retracted then by simply permitting the escape of fluid from the chamber or chambers 8, and the wheels are again restored to landing position by forcing the return of the fluid into the chamber or chambers 8 so that the shock absorber is extended again against the elastic forces. An example of one such arrangement is illustrated in Fig. 9. The cylinder 1 and piston rod 3 of the preceding figures will be recognized. To the lower cylinder head 13 is added, however, two diametrically opposite arms 52 and to the cap at the lower end of the piston rod 3 is likewise added two parallel arms 53. The series of elastic bands 54 connect the arms 52 and 53 and move the piston 2 upwardly when the fluid is released from the chamber 8.

It will be understood that my invention is not limited to the details of construction illustrated and described except as appears hereinafter in the claims:

I claim:

1. In a shock absorber for vehicles, a cylinder, a piston and piston rod therein, one end of said cylinder being closed, the piston rod being in the other end of said cylinder, fluid within the cylinder tending to hold the shock absorber in an extended condition, and means providing another chamber to receive fluid expelled from the cylinder between the piston and the closed end of said cylinder by relative movement of the cylinder and piston in a direction tending to collapse the shock absorber, said another chamber being connected to the cylinder through a restricted passage.

2. In a shock absorber for vehicles, a cylinder, a piston and piston rod therein, one end of said cylinder being closed, the piston rod being in the other end of said cylinder fluid within the cylinder tending to hold the shock absorber in an extended condition, and means providing another chamber to receive fluid expelled from the cylinder between the piston and the closed end of said cylinder by relative movement of the cylinder and piston in a direction tending to collapse the shock absorber, said another chamber being connected to the cylinder through a restricted passage, and means within said another chamber providing an elastic force against which said fluid is driven and which serves to expel fluid from said chamber to the cylinder to restore the cylinder and piston to their initial positions.

3. In a shock absorber, a cylinder, a piston therein, a hollow rod within the cylinder, a restricted passage being provided to connect the chamber within the hollow rod with the interior of the cylinder, fluid within the cylinder, a piston within the hollow rod movable by the fluid entering the hollow rod through the restricted passage, and means on the opposite side of the second mentioned piston to move the same in the opposite direction to return fluid from the hollow rod to the cylinder.

4. In a shock absorber, a cylinder, a piston therein, a hollow piston rod for said piston, a restricted passage through said piston connecting the chamber within the piston rod with the interior of the cylinder at the opposite side of said piston, fluid in the cylinder, a piston within the piston rod movable away from the first mentioned piston by the fluid entering the hollow of the piston rod through said restricted passage, and means at the side of the second mentioned piston opposite said fluid providing an elastic force to return said second mentioned piston toward the first mentioned piston and thereby return fluid from the piston rod to the cylinder.

5. The combination with an aircraft having landing wheels, of a cylinder, a piston therein, one being attached to a wheel and the other to the body of the aircraft, fluid in the cylinder to oppose relative movement of the cylinder and piston as the weight of the body of the aircraft rests on the wheel, a restricted passage being provided through which the fluid is forced as the piston and cylinder are moved relatively to each other, means for removing the fluid from the cylinder and returning it to the cylinder again, and means for moving the cylinder and piston, one with relation to the other, to retract the wheel.

6. The combination with an aircraft having landing wheels, of a cylinder, a piston therein, one being attached to a wheel and the other to the body of the aircraft, fluid within the chamber provided by the cylinder at one side of the piston to oppose relative movement of the cylinder and piston as weight of the body of the aircraft rests on said wheel, means providing a chamber other than that provided by the cylinder within the range of travel of the piston therein, the chamber of said means being connected to said fluid-containing chamber of the cylinder through a restricted passage through which fluid from the cylinder is expelled by relative movement of the cylinder and piston, and a source of fluid pressure from which fluid can be applied to the face of the piston opposite that facing said fluid-containing chamber of the cylinder to move the cylinder and piston relatively to retract said wheel.

7. The combination of claim 6 characterized by the fact that there is means providing an elastic force against which the fluid entering the second mentioned chamber is driven and which serves to return fluid from said second mentioned chamber to the cylinder to restore the cylinder and piston to their initial relative positions.

8. The combination of claim 6 characterized by the fact that there is means providing an elastic force against which the fluid entering the second mentioned chamber is driven and which serves to return fluid from said second mentioned chamber to the cylinder to restore the cylinder and piston to their initial relative positions, and that there is means to remove the first mentioned fluid from the cylinder when the wheel is retracted and to return this fluid again when the wheel is returned from retracted position.

9. The combination with the subject matter of claim 3, of a source of fluid pressure connected to the cylinder to impress fluid against the side of the first mentioned piston opposite that facing the said fluid within the cylinder, to move said cylinder and piston relatively in the same direction as drives said cylinder fluid into the hollow rod.

10. The combination with an aircraft having landing wheels, of a cylinder, a piston therein, a hollow piston rod for said piston, said cylinder and piston rod being connected one to the body and the other to a landing wheel of the aircraft, and there being a restricted passage through said piston connecting the chamber within the hollow piston rod with the interior of the cylinder at the opposite side of said piston, fluid in the cylinder at said opposite side of said piston, a piston within said piston rod movable away from the first mentioned piston by fluid entering the piston rod through said restricted passage, means at the side of the second mentioned piston opposite said fluid providing an elastic force to return said second mentioned piston toward the first mentioned piston and thereby return the fluid from the piston rod to the cylinder, a source of fluid pressure carried on said aircraft and connected to the cylinder to impress fluid on the face of the first mentioned piston opposite that facing the first mentioned fluid in the cylinder to move said cylinder and piston relatively to each other to retract the wheels, and means to permit the escape of the first mentioned fluid from the cylinder when the wheel is retracted and to return said fluid to the cylinder when the wheel is returned again.

11. In a shock absorber, a cylinder adapted to contain fluid, a piston and a hollow rod within the cylinder, a restricted passage connecting the hollow rod with the cylinder, a partition within the hollow rod movable by the fluid entering the hollow rod through the restricted passage and means on the opposite side of the partition to move the same in the opposite direction to return fluid from the hollow rod to the cylinder.

12. In a shock absorber, a cylinder adapted to contain fluid, a piston within the cylinder, means comprising another chamber to receive fluid expelled from the cylinder by relative movement of the cylinder and piston, said another chamber being connected to the cylinder through a restricted passage and means comprising a partition in said chamber adapted to close the restricted passage.

13. In a shock absorber, a cylinder adapted to contain fluid, a piston within the cylinder, means comprising another chamber to receive fluid expelled from the cylinder by relative movement of the cylinder and piston, said another chamber being connected to the cylinder through a restricted passage, means comprising a partition in said chamber adapted to close the restricted passage and means within said chamber providing an elastic force against which the partition is driven by said fluid and which serves to expel fluid from said chamber to the cylinder.

14. In a fluid shock absorber of cylinder and piston construction, a hollow rod within the cylinder, a restricted passage being provided to connect a chamber within the hollow rod with the interior of the cylinder, a partition within the hollow rod movable by the fluid entering the chamber through the restricted passage, said partition being adapted to close the restricted passage and means on the opposite side of the partition to move the same in the opposite direction to return fluid from the chamber to the cylinder.

15. In a shock absorber for vehicles a cylinder, a piston therein, fluid within the cylinder tending to extend the shock absorber, means providing another chamber, removed from said cylinder, to receive fluid expelled from the cylinder by relative movement of the cylinder and piston in a direction tending to collapse said shock absorber, said another chamber being connected to the cylinder through a restricted passage, and means adapted to retract and to extend said shock absorber.

16. The combination with an aircraft having a body and landing means, a shock absorbing device for the landing means, comprising a cylinder, a piston therein, fluid within the cylinder tending to extend the shock absorber, means providing another chamber, removed from said cylinder, to receive fluid expelled from the cylinder by relative movement of the cylinder and piston in a direction tending to collapse said shock absorber said another chamber being connected to the cylinder through a restricted passage and means adapted to impart relative movement to said cylinder and piston to extend or retract the shock absorber.

17. In a shock absorber a cylinder, a piston therein, a chamber connected to said cylinder through a restricted passage and adapted to receive fluid therefrom during shock absorption, a fluid system connecting opposite ends of the cylinder and a single valve for selectively directing fluid to either end of the cylinder and away from the other end.

18. In a shock absorber, a cylinder, a piston therein, a system of passages connecting opposite ends of the cylinder, a source of fluid pressure, a storage tank, and a single valve for connecting one end of the cylinder with said source of fluid pressure and the other end with said storage tank.

19. In an aircraft having a body and landing means, a retractible shock absorbing device comprising a cylinder and piston construction, a system of passages connecting opposite ends of the cylinder, a pump having an inlet and an outlet and a storage tank in the system and a single valve for selectively connecting either end with the pump outlet and the other end with the storage tank and pump inlet.

20. Landing gear for aircraft comprising a cylinder and a piston, means for controlling flow of fluid from one side of the piston to the other for absorbing shocks, and means controlled by a single valve for selectively supplying fluid to the either end of the cylinder for raising and lowering the landing gear.

21. Landing gear for aircraft comprising a cylinder and a piston, means for controlling flow of fluid from one side of the piston to the other for absorbing shocks and means controlled by a single valve for selectively supplying and withdrawing fluid from the opposite ends of the cylinder for raising and lowering the landing gear.

22. Landing gear for aircraft comprising a cylinder and a piston, a restricted passage for controlling flow of fluid from one side of the piston to the other for absorbing shocks, a source of fluid pressure and means controlled by a single valve for selectively supplying fluid to either end of the cylinder for raising and lowering the landing gear.

23. In an aircraft, a body, a plurality of ground engaging members for absorbing shock, and means controlled by a single valve for retracting said ground engaging members.

24. In an aircraft, a plurality of ground engaging members, means connecting the ground engaging members with the aircraft, for absorbing shock, and comprising cylinder and piston constructions, means for controlling the flow of fluid to absorb shocks and means controlled by a single valve for selectively supplying fluid to either end of the cylinders for raising and lowering the landing gear.

25. In an aircraft, a plurality of ground engaging members, means connecting the ground engaging members with the aircraft for absorbing shock when landing and comprising a plurality of cylinders and pistons, restricted passages for controlling the flow of fluid to absorb shocks, a source of fluid pressure, a storage tank and a single valve adapted in one position to connect one end of the cylinders with the source of fluid pressure and the opposite ends with the storage tank to extend said means, and in another position to connect said one end of the cylinders with the storage tank and the opposite end with the source of fluid pressure to retract said means.

26. In an amphibian, water engaging members, a plurality of ground engaging members for absorbing shock when landing and a single hydraulic means for retracting the ground engaging members to a position above the water line and for absorbing the shocks communicated from said ground engaging members.

27. In an amphibian, means for supporting the amphibian on water, a plurality of ground engaging members, liquid damping means for absorbing the shock of landing and a pump connected to said means for retracting the ground engaging members to a position above the water line.

28. Retractible landing gear for aircraft comprising a piston and cylinder construction, liquid in said cylinder, another chamber connected to said cylinder, a restricted passage between said cylinder and said another chamber, compressible means in said another chamber, said another chamber adapted to receive liquid expelled from said cylinder through said restricted passage by relative movement of said cylinder and piston, said compressible means adapted to return said liquid to said cylinder and hydraulic means for extending and retracting said landing means.

29. In an aircraft, a body and landing means, a retractible shock absorbing device comprising a cylinder and a piston therein, one of which is attached to the body and the other to the landing means, liquid in the cylinder, a restricted passage connecting said cylinder with another chamber, said another chamber adapted to receive liquid expelled through said restricted passage from said cylinder by relative movement of said cylinder and piston, said another chamber adapted to return said liquid to said cylinder through said restricted passage, and means for selectively supplying liquid under pressure to either side of said piston to thereby retract or extend said landing means.

30. In a shock absorber, a cylinder, a piston, a chamber connected with said cylinder, a restricted passage between said chamber and said cylinder, a source of fluid pressure, a storage tank, and a system of passages, including the source of fluid pressure and the tank, connecting the opposite ends of the cylinder.

31. In an aircraft, a plurality of ground engaging members, means between the ground engaging members and the aircraft adapted to absorb shocks and comprising cylinder and piston constructions, each cylinder having a chamber connected therewith, a restricted passage between said chamber and said cylinder for controlling the flow of fluid to and from said chamber, a source of fluid pressure, a storage tank, and a system of passages, including the source of fluid pressure and the tank, connecting the opposite ends of the cylinder.

32. In a shock absorber, a cylinder adapted to contain a liquid, a piston within the cylinder, means comprising another chamber containing compressible means, and adapted to receive liquid expelled from the cylinder by relative movement of the piston and cylinder, and a storage tank adapted to receive fluid expelled from the cylinder by relative movement of the piston and cylinder in the opposite direction.

33. In an aircraft, a body, and a retractible shock absorbing landing device therefor comprising a ground engaging member, a telescopic strut for supporting said member on said body and embodying a piston and cylinder construction, a closed fluid system interconnecting opposite ends of said cylinder, and means for controlling the flow of fluid from one end of said cylinder to the other.

34. In an aircraft, a body, and a retractible shock absorbing landing device therefor comprising a ground engaging member, a telescopic strut for supporting said member on said body and embodying a piston and cylinder construction, liquid damping means within said cylinder, and means for controlling the flow of fluid from one side of said piston to the other to permit the retraction of the member towards the body while in flight.

35. In an aircraft, a body, and a retractible shock absorbing landing device therefor comprising a ground engaging member, a telescopic strut for supporting said member on said body and embodying a piston and cylinder construction, fluid damping means within said cylinder, a connection between opposite ends of said cylinder, and means for forcing fluid through said connection from one end of the cylinder to the other to cause the member to be moved in relation to the body.

36. In an airplane, a fuselage, a ground wheel therefor, liquid damping means for absorbing the shock of landing and a pump connected to said means for retracting the wheel.

37. In an airplane, a fuselage, a ground wheel for said fuslage for taking the entire shock of landing, and hydraulic means for retracting the ground wheel and for absorbing the shocks communicated therefrom.

38. In an airplane, a fuselage, landing means therefor, liquid damping means for absorbing the shock of landing and a pump connected to said means for retracting the landing means.

39. In an airplane, a fuselage, landing means for said fuselage for taking the entire shock of landing, and hydraulic means for retracting the landing means and for absorbing the shocks communicated therefrom.

40. In an aircraft, a body, and a retractible shock absorbing landing device therefor comprising a ground engaging member, a telescopic strut for supporting said member on said body and embodying a piston and cylinder construction, fluid damping means within said cylinder, a connection between opposite ends of said cylinder, and means for forcing fluid through said connection from one end of the cylinder to the other to cause the member to be moved in relation to the body to extend the ground engaging member.

41. A retractible, extensible and shock absorbing landing gear for aircraft comprising in combination, a cylinder and piston construction in which shock of landing is absorbed by the flow of liquid from one end of said cylinder through a restricted orifice, and means for forcing liquid into the same end of said cylinder for extending the landing gear.

42. In an airplane, a fuselage, landing means therefor, liquid damping means for absorbing the shock of landing and a power-operated pump connected to said means for retracting the landing means.

43. The combination with an aircraft having landing wheels, of a combined shock absorber and wheel retractor comprising a cylinder, a piston therein, one being attached to the wheel and the other to said aircraft, liquid within the cylinder to oppose relative movement of the cylinder and piston as the weight of the aircraft rests on the wheel and a source of hydraulic pressure carried by the aircraft and connected to the combined shock absorber and wheel retractor from which liquid can be applied to the combined shock absorber and wheel retractor to move the cylinder and the piston relatively to each other to retract the wheel.

In testimony whereof, I have signed this specification.

IGOR SIKORSKY.